United States Patent
Fu (10) Patent No.: US 10,708,084 B2
(45) Date of Patent: Jul. 7, 2020

(54) DEPLOYMENT OF VIRTUAL EXTENSIBLE LOCAL AREA NETWORK

(71) Applicant: Hewlett Packard Enterprise Development LP, Houston, TX (US)

(72) Inventor: Zhihua Fu, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/358,258

(22) Filed: Mar. 19, 2019

(65) Prior Publication Data

US 2019/0215191 A1 Jul. 11, 2019

Related U.S. Application Data (63) Continuation of application No. 15/522,818, filed on Apr. 28, 2017, now Pat. No. 10,263,808.

(51) Int. Cl.
*H04L 12/46* (2006.01)
*H04L 29/12* (2006.01)
*H04L 12/751* (2013.01)

(52) U.S. Cl.
CPC ...... *H04L 12/4679* (2013.01); *H04L 12/4633* (2013.01); *H04L 12/4675* (2013.01); *H04L 61/2592* (2013.01); *H04L 45/02* (2013.01); *H04L 2012/4629* (2013.01); *H04L 2212/00* (2013.01)

(58) Field of Classification Search
CPC ............. H04L 12/4679; H04L 12/4633; H04L 12/4675; H04L 61/2592
See application file for complete search history.

(56) References Cited

U.S. PATENT DOCUMENTS

| 2002/0196159 | A1 | 12/2002 | Lesenne |
| 2014/0146817 | A1 | 5/2014 | Zhang |
| 2017/0302476 | A1* | 10/2017 | Yang ...................... H04L 12/46 |

FOREIGN PATENT DOCUMENTS

| CN | 101977156 | 2/2011 |
| CN | 103475560 | 12/2013 |
| CN | 103618596 | 3/2014 |
| CN | 103647853 | 3/2014 |
| CN | 103957160 | 10/2014 |
| CN | 104104747 | 10/2014 |

OTHER PUBLICATIONS

International Preliminary Report on Patentability received for PCT Patent Application No. PCT/CN2015/093167, dated May 11, 2017, 6 pages.
International Searching Authority, "Notification of Transmittal of the International Search Report and the Written Opinion", PCT Patent Application No. PCT/CN2015/093167, dated Feb. 5, 2016, 11 pages.

* cited by examiner

*Primary Examiner* — Ronald B Abelson (57) ABSTRACT

According to an example, a Virtual Extensible Local Area Network Tunnel End Point (VTEP) sends a Virtual Extensible Local Area Network (VXLAN) information announcement message carrying the identifiers of VXLAN instances to the neighbor VTEPs and receive VXLAN information announcement messages from the neighbor VTEPs. If a neighbor VTEP is configured with the same VXLAN instance as the present VTEP, the present VTEP sets up a tunnel to the neighbor VTEP; and associates the tunnel with the same VXLAN instance.

17 Claims, 4 Drawing Sheets

DEPLOYMENT OF VIRTUAL EXTENSIBLE LOCAL AREA NETWORK

CROSS REFERENCE TO RELATED APPLICATION

This application is a continuation of co-pending U.S. patent application Ser. No. 15/522,818 filed Apr. 28, 2017, the entire contents of which are hereby incorporated by reference as though fully set forth herein.

BACKGROUND

Data centers have been predominantly applied by enterprises in information technology deployment. Cloud computing networks have been widely deployed for the data centers, and virtualization including server virtualization, storage virtualization, network virtualization, etc., has almost become an underlying technology in the cloud computing networks. Services and resources of the cloud computing networks are shared by a number of tenants in the virtualized environment. Taking a public cloud computing network as an example, an application system designed by a cloud service provider will be adapted to be accessed by a number of tenants in the same environment. Virtualized resources of the different tenants can be separated and isolated from each other to thereby better guarantee the privacy and the security of data of the tenants.

DETAILED DESCRIPTION OF THE EMBODIMENTS

In a cloud computing network, in order to enable virtualized resources of different tenants to be separated and isolated from each other to thereby better guarantee the privacy and the security of data of the tenants, communication of the tenants can be isolated by using the Virtual Local Area Network (VLAN) technology. Furthermore, since the length of a VLAN identifier is 12 bits, it may isolate at most 4096 tenants and may be far insufficient for the cloud computing network environment. The Virtual Extensible Local Area Network (VXLAN) technology has emerged in response to this. For example, the VXLAN network is segmented into a two-layer network using a 24-bit identification field so that almost 16 millions of tenants can share the same network infrastructure while being isolated from each other.

In the network deployment architecture of the VXLAN network, a Virtual Machine (VM) on a server accesses the VXLAN network through a VXLAN Tunnel End point (VTEP). One or more VMs can be created on a server, and the different VMs can access the same or different VXLAN instances, where each VXLAN instance may be a separate forwarding entity in the VXLAN network, and VMs accessing the same VXLAN instance belong to a same logic layer-2 network and communicate with each other at layer-2. VMs accessing different VXLAN instances are isolated from each other in two-layer forwarding. VXLAN instances can be created for the respective tenants to distinguish the different tenants by the VXLAN instances. The VXLAN instances are typically distinguished from each other by their identities (ID), where the identities of the VXLAN instances can be specified by a network administrator or can be generated automatically when the VXLAN instances are created or can be embodied as the ID of the VXLAN, also referred to as a VXLAN Network Identifier (VNI) which may have a length of 24 bits.

The VTEP is an edge device of the VXLAN network, and for a data packet from the VM, the VTEP recognizes the VXLAN instance accessed by the VM, and forwards the data packet at the layer-2 over a VXLAN tunnel after VXLAN-encapsulating the data packet according to the VXLAN instance. For a data packet from the VXLAN tunnel, the VTEP forwards the data packet to the corresponding VM at a destination address after VXLAN-de-encapsulating the data packet. The VTEP can be implemented on the server or on a network device; and may be embodied as a separate physical device or can reside on the same sever having the accessing the VM.

The VXLAN tunnel is a point-to-point logic tunnel between the VTEPs for transmitting the encapsulated VXLAN data packet to the remote VTEP over the physical network. The tunnel is set up between the two VTEP and associated with the VXLAN instance, and then can operate as a transmission path of the VXLAN instance to transmit the VXLAN data packet between these two VTEPs.

The VXLAN network may be an mesh network deployment architecture. If both of any two VTEPs belonging to the same VXLAN instance are associated with a tunnel of the VXLAN instance for interconnection, then these VTEPs can communicate with each other based upon the VXLAN instance.

Figure 1:
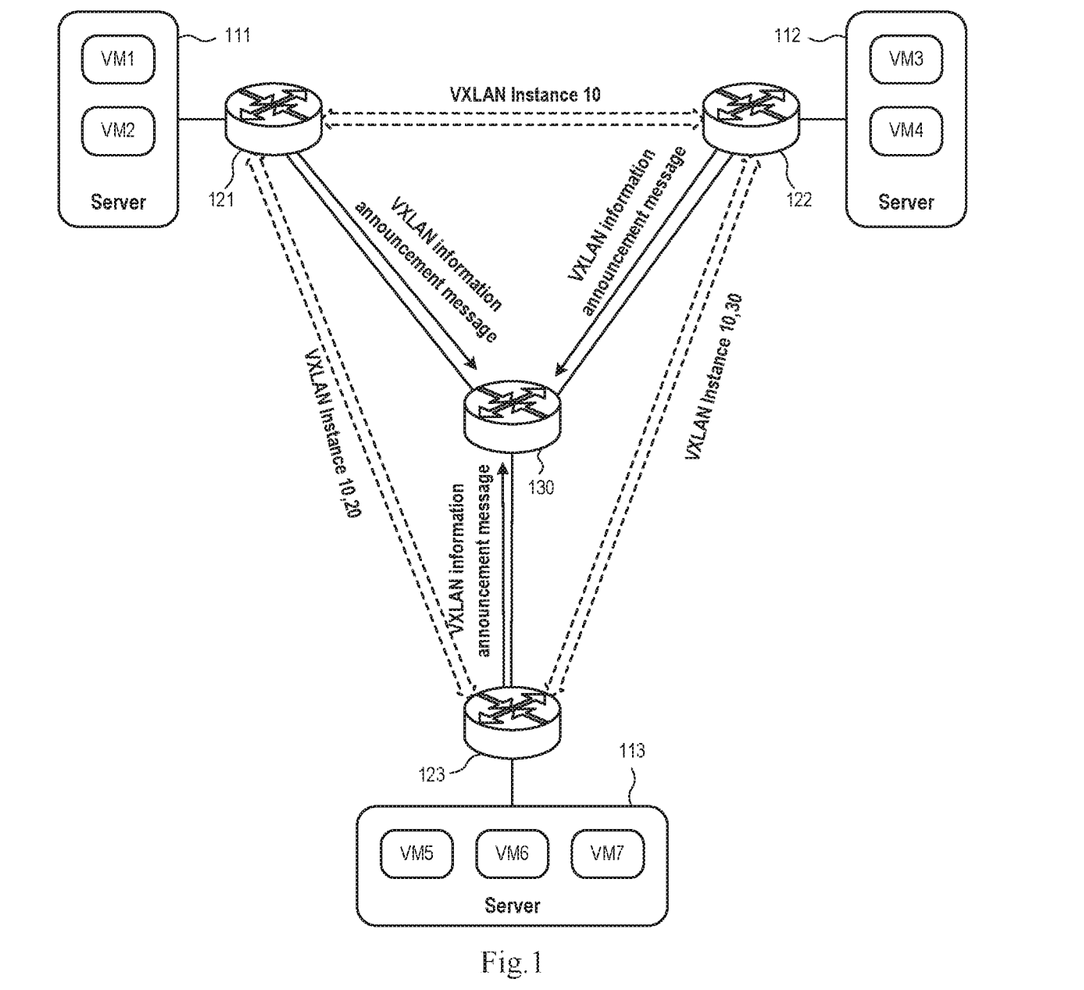
FIG. 1 is a schematic diagram of network deployment of a Virtual Extensible Local Area Network (VXLAN) network in an example.

Taking the VXLAN network illustrated in FIG. 1 as an example, a VM1 and a VM2 on a server 111 access the VXLAN network through a VTEP 121, where the VM1 and the VM2 access VXLAN instances 10 and 20 respectively; a VM3 and a VM4 on a server 112 access the VXLAN network through a VTEP 122, where the VM3 and the VM4 access the VXLAN instance 10 and a VXLAN instance 30 respectively; a VM5, a VM6 and a VM7 on a server 113 access the VXLAN network through a VTEP 123, where the VM5, the VM6 and the VM7 access the VXLAN instances 10, 20 and 30 respectively; and the VTEPs 121, 122 and 123 are connected respectively with a network device 130 which does not participate in processing in the VXLAN but simply forwards an encapsulated transmitted message to a corresponding VTEP at a destination address of the message.

The VMs accessing the VXLAN instance 10 include the VM1, the VM3 and the VM5. Tunnels can be set up respectively between the VTEP 121 and the VTEP 122, between the VTEP 121 and the VTEP 123, and between the VTEP 122 and the VTEP 123. In order to enable the VM1, the VM3 and the VM5 can communicate with each other, the above mentioned setup tunnels need to be associated with the VXLAN instance 10 on all the three VTEPs. Since a tunnel has been set up between the VTEP 121 and the VTEP 123, this setup tunnel should also be associated with the VXLAN instance 20 respectively on the VTEP 121 and the VTEP 123, so that the VM2 and the VM6 can communicate with each other based upon the VXLAN instance 20.

Such a configuration task may be performed manually by the network administrator so that a tunnel is set up between VTEPs belonging to the same VXLAN instance and associated with the VXLAN instance. Thus, if there are N (N>1) VTEP nodes in the VXLAN network, then N(N−1)/2 tunnels will be set up and associated with VXLAN instances, thus resulting in a significant workload of manual network deployment for the network administrator. In addition, if a VTEP node is added to the VXLAN network, then all the VTEPs will be checked for the same VXLAN instance as that on the newly added VTEP, and if there is the same VXLAN instance, then a tunnel will be set up and associated with the VXLAN instance. Furthermore, if a VXLAN instance configured on a VTEP in the network is changed, then the same process will be also performed. Thus, manual network maintenance may become complicated and troublesome, and prone to an error, thus resulting in a high cost of network management.

Figure 2:
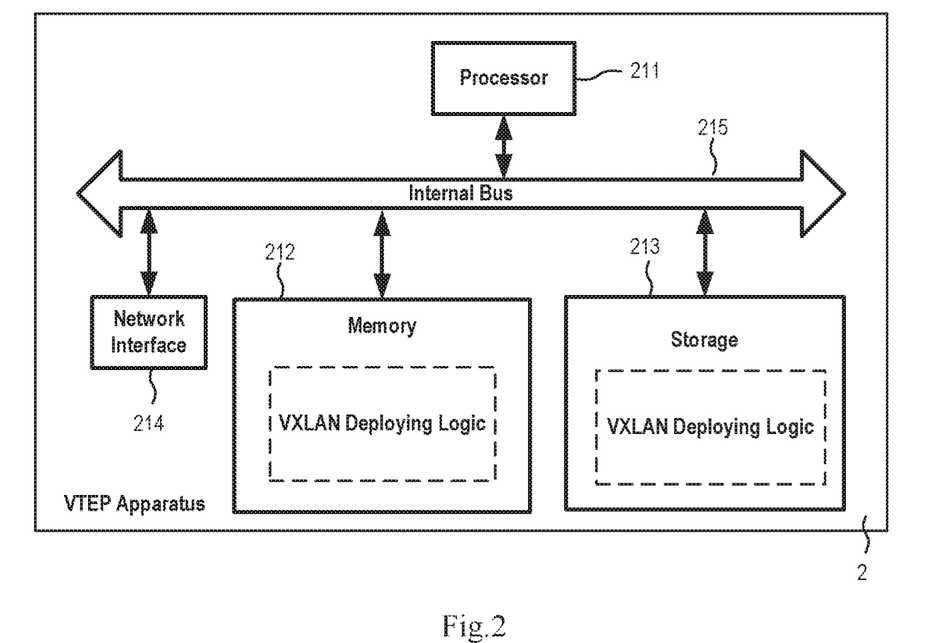
FIG. 2 is a schematic diagram of a hardware architecture of a hardware device where a VTEP is located in an example.
Figure 3:
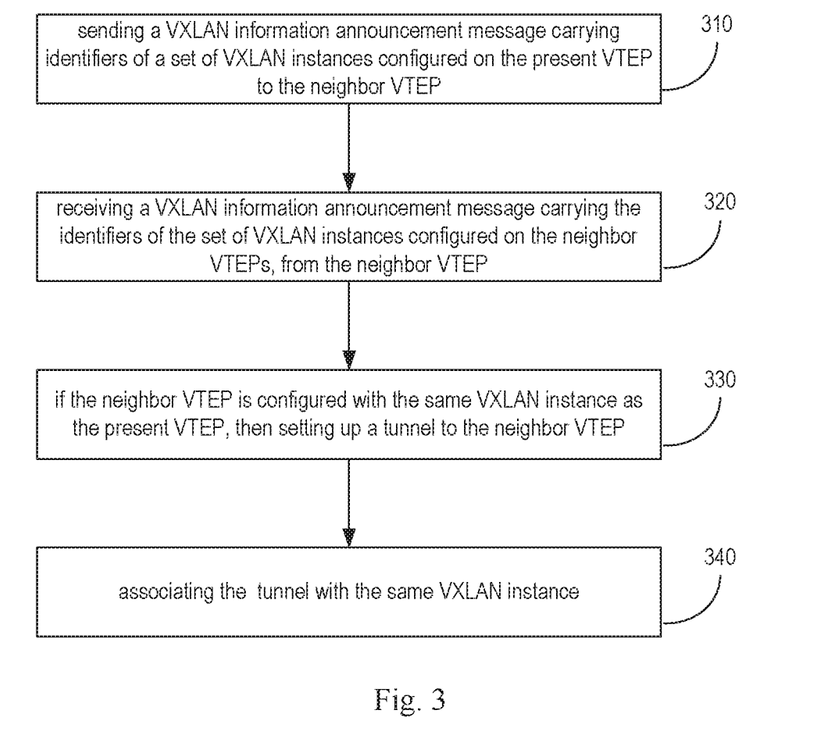
FIG. 3 is a flow chart of a method for deploying a VXLAN in an example.

In an example of the disclosure, a VXLAN deploying logic including a set of machine readable instructions and operating on a VTEP can discover automatically another VTEP belonging to the same VXLAN instance, set up a tunnel therewith, and associate the tunnel with the VXLAN instance. Referring to FIG. 2, a VTEP apparatus 2 where a VTEP resides can include a processor 211, a memory 212, a nonvolatile memory 213, and a network interface 14, all of which are connected with each other by an internal bus 215. In this example, the processor 211 can fetch the VXLAN deploying logic from the nonvolatile storage 213 into the memory 212 for operation in an operational flow as illustrated in FIG. 3.

In this example, all the VTEPs in the VXLAN network have a neighbor relationship. For some VTEP, all the other VTEPs in the VXLAN network are neighbor VTEPs thereof.

In the block 310, the VTEP sends a VXLAN information announcement message carrying the identifiers of a set of VXLAN instances configured on the present VTEP to a neighbor VTEPs.

In an example, after a neighbor relationship is set up between the VTEPs in the VXLAN network (for example, after a new VTEP joins the VXLAN network which has been initialized in configuration), the VTEP fetches local VXLAN configuration information, encapsulates the identifiers of all the VXLAN instances configured on the present VTEP into the VXLAN information announcement message, and sends the VXLAN information announcement message to the neighbor VTEPs.

The VXLAN information announcement message may have any format and is not limited to a particular type of format. Likewise any suitable mechanism may be used to create and maintain the neighbor relationship between the VTEPs.

In one example, the VXLAN network can be regarded as an autonomous domain, and some Interior Gateway Protocol (IGP) operates on all the VTEPs, e.g., the Intermediate System to Intermediate System Intra-Domain Routing Exchange Protocol (IS-IS), the interior Border Gateway Protocol (iBGP), the Open Shortest Path First (OSPF), the Interior Gateway Routing Protocol (IGRP), etc. Following the interior gateway protocol, the respective VTEPs in the VXLAN network create and maintain the neighbor relationship based upon the interior gateway protocol, and the neighbor VTEPs exchange with each other messages to transfer routing information, so that the respective VTEPs can generate a routing table for data packet forwarding according to the topology of the autonomous domain.

The message for spreading routing information will vary with the different protocol, but generally an extension field can be added or a reserved field can be used to announce other data to the neighbor VTEPs to thereby support an additional function based upon the protocol. The extension field or the reserved field of the message for spreading routing information can carry the identifiers of the VXLAN instances configured on the present VTEP to thereby announce those VXLAN instances on the present VTEP to the neighbor VTEPs using the IGP.

In the block 320, the VTEP receives VXLAN information announcement message carrying the identifiers of VXLAN instances configured on the neighbor VTEP, from the neighbor VTEP.

Each of the VTEPs with a neighbor relationship in the VXLAN network will both send the VXLAN information announcement message to the neighbor VTEPs and receive the VXLAN information announcement messages, carrying the identifiers of the VXLAN instances configured on the neighbor VTEPs, from the neighbor VTEPs.

In the VXLAN network, each VTEP can send the VXLAN information announcement message of the present VTEP to all the neighbor VTEPs thereof; or all the VTEPs can be regarded as a multi-cast group, and the VTEP can send the VXLAN information announcement message in a multi-cast mode; or some node in the VXLAN network can operate as a relay node to forward the VXLAN information announcement message between the VTEPs, although this example will not be limited in this regard.

In the block 330, if the neighbor VTEP is configured with the same VXLAN instance as the present VTEP, then the VTEP sets up a tunnel to the neighbor VTEP.

The VTEP may get the VXLAN instances configured on the neighbor VTEPs from the received VXLAN information announcement messages. The VTEP may determine whether the present VTEP is configured with the same VXLAN instance as that on some neighbor VTEP, and those VXLAN instances configured on both the present VTEP and the neighbor VTEP, by comparing the VXLAN instances configured on the neighbor VTEPs with the VXLAN instances configured on the present VTEP. If the present VTEP is configured with the same VXLAN instance with the neighbor VTEP, then the tunnel is set up between the present VTEP and the neighbor VTEP.

In the block 340, the VTEP associates the setup tunnel with the same VXLAN instance After the tunnel is set up successfully, the VTEP associates the setup tunnel respectively with the respective VXLAN instances configured on both the present VTEP and the neighbor VTEP. Thus traffic (data packets) in these VXLAN instances on the present VTEP can reach the neighbor VTEP over the associated tunnel. After the neighbor VTEP performs the blocks 330 and 340, the neighbor VTEP will also associate the VXLAN instances configured on both the neighbor VTEP and the present VTEP with the tunnel to the present VTEP, so that traffic in these VXLAN instances on the neighbor VTEP can also reach the present VTEP over the tunnel.

More than one tunnel can be created between the present VTEP and the neighbor VTEP and associated with the same or different VXLAN instances, although this example will not be limited in this regard.

The flow above in this example will operate on all the neighbor VTEPs in the VXLAN network, and the VTEPs announce to each other the VXLAN instances configured for the respective VTEPs, so that each VTEP can discover all the other VTEPs configured with the same VXLAN instances, set up a tunnel sequentially with these VTEPs, and associate the setup tunnel with the VXLAN instance. Apparently in this example, a VTEP can be discovered automatically in the VXLAN network instead of creating and associating a tunnel with a VXLAN instance manually by the network administrator, thus alleviating a burden on the network administrator, avoiding a human error from occurring, and lowering a cost of network maintenance.

If a new VTEP is added to the VXLAN network, then the newly joining will send a VXLAN information announcement message to neighbor VTEPs after creating a neighbor relationship with the original respective VTEPs, and the original VTEPs will also send VXLAN information announcement messages to the newly joining neighbor. In other words, the blocks 310 to 340 are performed respectively on the respective VTEPs, so that all the VTEPs can be updated in configuration automatically after the VXLAN network is extended in capacity.

In an example, if one of the VXLAN instances configured on the present VTEP is changed, then the VTEP can notify the neighbor VTEPs of the VXLAN instance change, and update the VXLAN related configuration of the present VTEP with the VXLAN instance change. In anther example, the VTEP can update the VXLAN related configuration of the present VTEP with a VXLAN instance change of a neighbor VTEP upon reception of the VXLAN instance change of the neighbor VTEP.

The VXLAN related configuration can be updated with the VXLAN instance change of the present VTEP or the neighbor VTEP by updating the tunnel with the neighbor VTEP and/or updating the VXLAN instances associated with the tunnel. Particularly if a VXLAN instance already configured on the neighbor VTEP is added to the present VTEP, or a VXLAN instance already configured on the present VTEP is added to the neighbor VTEP, then the VXLAN instance configured on both the present VTEP and the neighbor VTEP are newly added to both of the VTEPs, and at this time a tunnel to the neighbor VTEP can be created and associated with the newly added VXLAN instance configured for both of the VTEPs, or an existing tunnel to the neighbor VTEP can be associated with the newly added VXLAN instance configured for both of the VTEPs. If a VXLAN instance already configured on the neighbor VTEP is deleted on the present VTEP, or a VXLAN instance already configured on the present VTEP is deleted on the neighbor VTEP, then the VXLAN instance configured for both the present VTEP and the neighbor VTEP is removed from both of the VTEPs, and at this time the tunnel to the neighbor VTEP is dissociated from the removed VXLAN instance configured for both of the VTEPs; and since all the VTEPs in the same VXLAN instances are point-to-point connected with each other over tunnels, dissociation of a tunnel to some neighbor VTEP from some VXLAN instance will be equivalent to deletion on the present VTEP of the neighbor VTEP from the VTEPs belonging to the VXLAN instance. If there is no further VXLAN instance configured for both the present VTEP and the neighbor VTEP, then the tunnel between the present VTEP and the neighbor VTEP can be torn down.

If the same IGP operates on all the VTEPs, then since the IGP protocol is provided with a routing information update mechanism, if the network topology of the autonomous domain is changed, then a VTEP sensing this change can send a routing information update message to the neighbors, so that the respective VTEPs will adjust the local routing tables to the new topology in a timely manner. With this mechanism, the VXLAN instance information can be updated, so that if the VXLAN instance information configured on the present VTEP is changed, then the routing information update mechanism of the IGP will be triggered, and the VXLAN instance change on the present VTEP can be carried in an extended field or a reserved field of the routing information update message.

If one of the VXLAN instances configured on the VTEP is changed, then the VTEP will announce it to the other neighbor VTEPs, so that each VTEP can update the VXLAN related configuration of the present VTEP with the change, thus further alleviating the maintenance effort of the VXLAN network and lowering the cost of maintenance.

Another example of the disclosure will be described below taking the network illustrated in FIG. 1 as an example. In this example, the VXLAN network is an autonomous domain and the VTEPs are IGP neighbors and communicate with each other using an IGP protocol. In the following description the iBGP protocol is used as an example, and operates on each of the VTEPs which are iBGP neighbors of each other. In other examples, the VTEPs may use other IGP protocols instead such as IS-IS, OSPF or IGRP etc The VXLAN instances are identified by their VNI.

As described above, the VXLAN network instances 10 and 20 are configured on the VTEP 121 and accessed respectively by the virtual machines VM1 and VM2; the VXLAN network instances 10 and 30 are configured on the VTEP 122 and accessed respectively by the virtual machines VM3 and VM4; and the VXLAN network instances 10, 20 and 30 are configured on the VTEP 123 and accessed respectively by the virtual machines VM5, VM6 and VM7.

If the VTEP 123 newly joins the VXLAN network illustrated in FIG. 1, then the VTEP 123 generates and sends a BGP Updating message to the VTEP 121 and the VTEP 122 to announce information about the present VTEP to the neighbors, after creating a neighbor relationship with the VTEP 121 and the VTEP 122 using the iBGP protocol. The VTEP 121 and the VTEP 122 will also send BGP Updating messages carrying information about the respective VTEPs to the new neighbor.

Figure 4:
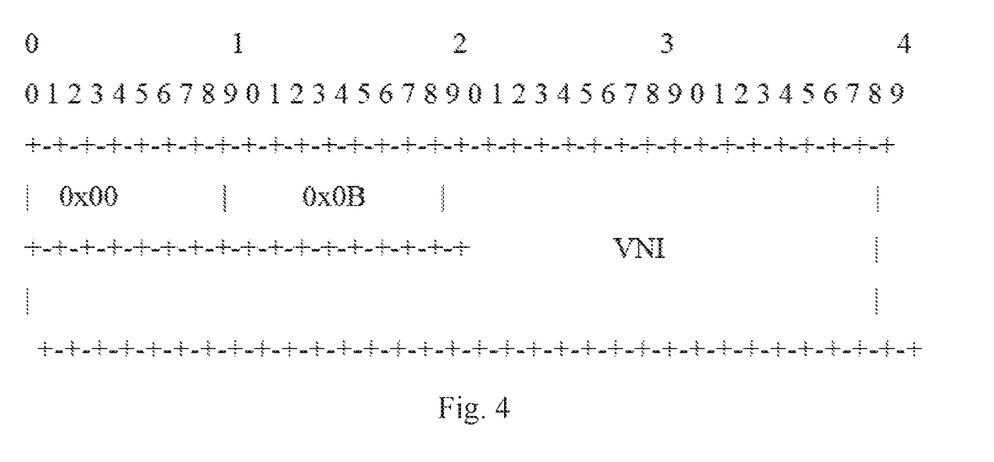
FIG. 4 is a schematic diagram of a format of a VXLAN Network Identifier (VNI) extensible community in an example.

The identifier of the VXLAN network instance can be distributed using an extended community attribute of the BGP protocol. For example, a VNI extended community may have the format illustrated in FIG. 4, where the first two bytes of 0x000B indicate that the extended community is a VNI extended community, and the following bytes carry the VNI of the VXLAN network instance. The VNI extended community of the BGP may be encapsulated in the BGP Updating message.

Also the identifier of the VTEP can be carried in the BGP Updating message to indicate the VTEP on which the VXLAN network instance in the VNI extended community is configured. The identifier of the VTEP can be embodied as any parameter unique to each VTEP in the VXLAN network, for example, the identifier of the VTEP can be embodied as the IP address (e.g., a loop-back address) of the VTEP, so that a tunnel end point in a VXLAN instance (referred to as a VXLAN site) can be determined uniquely by a two-element group (VNI, IP address of VTEP).

Network Layer Reachability Information (NLRI) to announce the identifier of the VTEP can be defined and encapsulated in the Multi-protocol Reachable NLRI (MP_REACH_NLRI) field or the Multi-protocol Unreachable NLRI (MP_UNREACH_NLRI) field, and sent to the neighbor VTEPs. The MP_REACH_NLRI field or the MP_UNREACH_NLRI field is a component of the BGP Updating message, where the MP_REACH_NLRI field distributes information about a reachable destination network, and corresponding next hop information, and the MP_UNREACH_NLRI field revokes an unreachable route.

Figure 5:
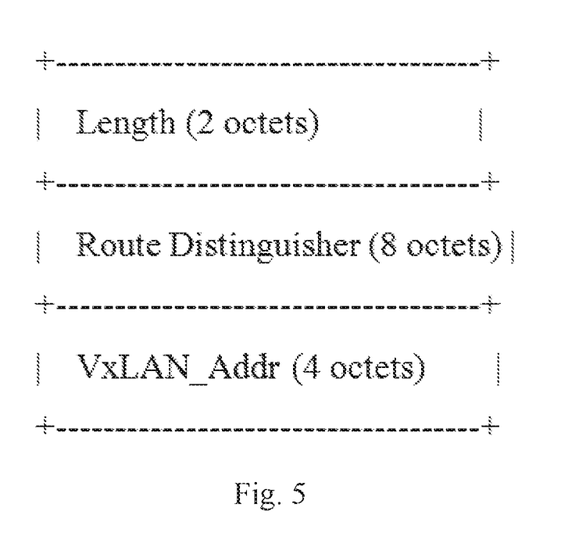
FIG. 5 is a schematic diagram of a format of a Network Layer Reachability Information (NLRI) in an example.

In an example, the NLRI carrying the identifier of the VTEP is in the format as illustrated in FIG. 5, where the Length field of two bytes indicates the number of bytes in the present NRLI; the Route Distinguisher field of eight bytes distinguishes a Virtual Private Network (VPN) from another; and the VxLAN_Addr (VXLAN address) of four bytes carries the identifier of the VTEP.

Both The VNI extended community, and the NLRI carrying the identifier of the VTEP are encapsulated in the BGP Updating message in the format specified in the BGP protocol, so that the identifiers of the VXLAN instances configured on the VTEP, and the identifier of the VTEP are distributed to the neighbor VTEPs in the BGP Updating message, in other words, those VXLAN sites configured on the VTEP are announced to the neighbor VTEPs.

Returning to FIG. 3, upon reception of the BGP Updating messages, carrying the identifiers of the VXLAN instances, sent by the VTEP 121 and the VTEP 122, the VTEP 123 can know that the VXLAN instances 10 and 20 are configured on both the present VTEP and the VTEP 121, and then sets up a tunnel with the VTEP 121, and associates the setup tunnel respectively with the VXLAN instances 10 and 20; and alike the VTEP 123 can know that the VXLAN instances 10 and 30 are configured on both the present VTEP and the VTEP 122, and then sets up a tunnel with the VTEP 122, and associates the setup tunnel respectively with the VXLAN instances 10 and 30. Similarly the tunnel to the VTEP 123 is associated respectively with the VXLAN instances 10 and 20 on the VTEP 121; and the tunnel to the VTEP 123 is associated respectively with the VXLAN instances 10 and 30 on the VTEP 122. Thus the virtual machines VM5, VM6 and VM7 accessing through the VTEP 123 can communicate with the virtual machines in the same VXLAN instance, accessing through the other VTEPs, respectively in the VXLAN instances 10, 20 and 30.

Figure 6:
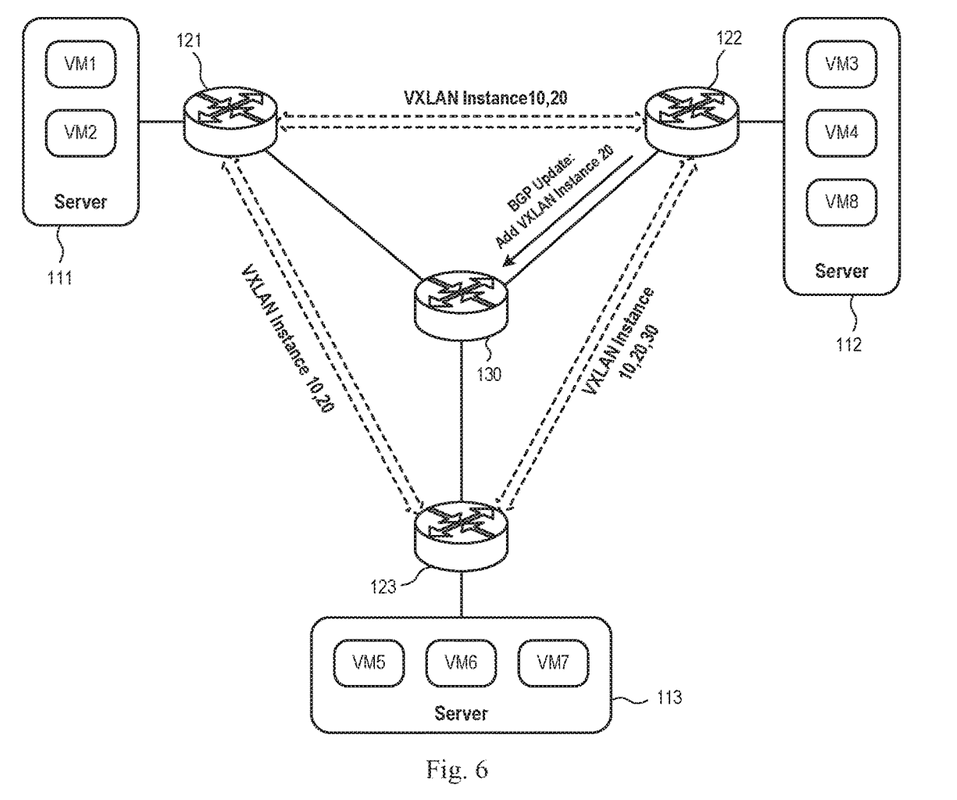
FIG. 6 is a schematic diagram of network deployment of the VXLAN network in FIG. 1 after the VXLAN is changed in configuration.

If the configuration information on one of the VTEPs is changed, then the VTEP will announce this change to the neighbors as well as the change in VXLAN configuration on the VTEP in the BGP Updating message using the iBGP protocol. If a virtual machine VM8 accessing the VXLAN 20 is added to the VTEP 122 in the network illustrated in FIG. 1, then referring to FIG. 6, the VTEP 122 generates the BGP Updating message to announce the addition of the VXLAN 120 to the present VTEP to the VTEP 121 and the VTEP 123. The VTEP 122 searches the locally stored identifiers of the instances configured on the VTEP 121 and the VTEP 123, and discovers that the VXLAN 20 is configured on both the VTEP 121 and the VTEP 123, and since there are existing tunnels set up to the VTEP 121 and the VTEP 123, these two tunnels are associated respectively with the VXLAN 20. Alike the VTEP 121 and the VTEP 123 will also associate the tunnel to the VTEP 122 with the VXLAN 20 upon reception of the BGP Updating message of the VTEP 122. Thereafter the VM8 can communicate with the VM2 and the VM6 in the VXLAN 20.

In correspondence to the flow above, the disclosure further provides a device for deploying a VXLAN according to any of the methods described above. The device may be implemented as hardware or software in combination with suitable hardware such as a processor. In one example the device may implement the method by executing with a processor, machine readable instructions stored on a non-transitory machine readable storage medium. For example, if the device is embodied in software, then the device can be logically embodied as the processor 211 in FIG. 2 fetching the VXLAN deployment control logic into the memory 212 for operation.

Figure 7:
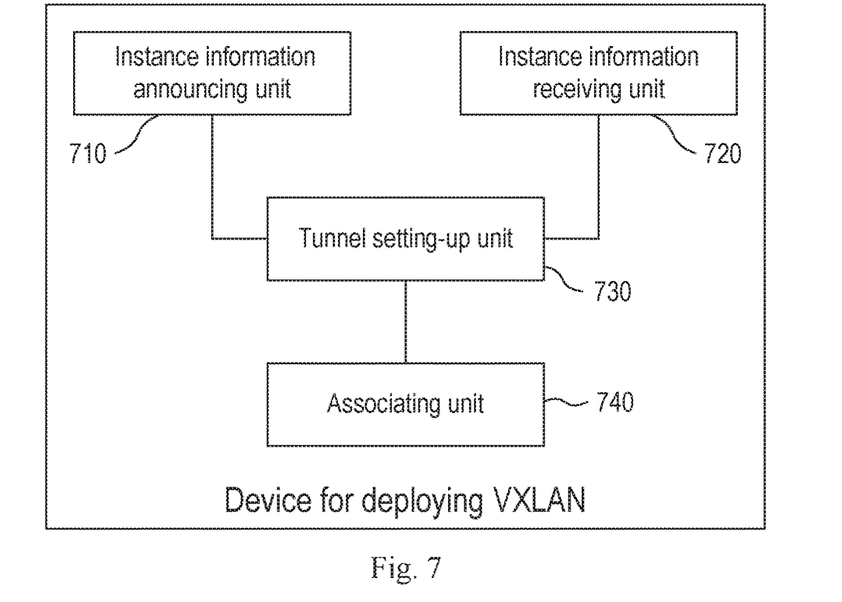
FIG. 7 is a logic structural diagram of a device for deploying a VXLAN in an example.

FIG. 7 illustrates a device for deploying a VXLAN in an example of the disclosure, applicable to a VTEP which is a neighbor of the other VTEPs in a network where the VTEP resides, where the device includes an instance information announcing unit 710, an instance information receiving unit 720, a tunnel setting-up unit 730, and an associating unit 740, where the instance information announcing unit 710 is configured to send a VXLAN information announcement message carrying the identifiers of VXLAN instances configured on the present VTEP to the neighbor VTEPs; the instance information receiving unit 720 is configured to receive VXLAN information announcement messages, carrying the identifiers of VXLAN instances configured on the neighbor VTEPs, from the neighbor VTEPs; the tunnel setting-up unit 730 is configured, if some neighbor VTEP is configured with the same VXLAN instance as the present VTEP to set up a tunnel to the neighbor VTEP; and the associating unit 740 is configured to associate the setup tunnel with the respective VXLAN instances configured on both the present VTEP and the neighbor VTEP.

In an example, the device further includes an instance change notifying unit and an instance change updating unit, where if one of the VXLAN instances configured on the present VTEP is changed, then the instance change notifying unit is configured to notify the neighbor VTEPs of the VXLAN instance change; and the instance change updating unit is configured to update the tunnel with the neighbor VTEP, and/or to update the VXLAN instances associated with the tunnel, with the VXLAN instance change.

In an example, the device further includes an instance change receiving unit and an instance change updating unit, where the instance change receiving unit is configured to receive a VXLAN instance change from the neighbor VTEP; and the instance change updating unit is configured to update the tunnel with the neighbor VTEP, and/or to update the VXLAN instances associated with the tunnel, with the VXLAN instance change.

In the two examples above, the instance change updating unit is configured, if a VXLAN instance configured for the present VTEP and some neighbor VTEP is newly added to both of the VTEPs, to associate the tunnel to the neighbor VTEP with the newly added VXLAN instance configured on both of the VTEPs; and if a VXLAN instance configured for both the present VTEP and some neighbor VTEP is removed from both of the VTEPs, to dissociate the tunnel to the neighbor VTEP from the removed VXLAN instance configured on both of the VTEPs, using the VXLAN instance change.

The VTEP and the other VTEPs can be neighbors on which the same interior gateway protocol operates; and the VXLAN information announcement message may be a message of the interior gateway protocol for spreading routing information.

In an example, the neighbor VTEP is an interior Border Gateway Protocol (iBGP) neighbor; and the VXLAN information announcement message may be included in a BGP Update message carrying the identifiers of the VXLAN instances configured on the present VTEP, and the identifiers of the VXLAN instances configured on the present VTEP are encapsulated in VNI extensible community.

In correspondence to the flow above, the disclosure further provides a non-transitory machine readable storage medium on which several computer instructions are stored, where the computer instructions are executed by a processor to perform a process including: sending a VXLAN information announcement message carrying the identifiers of VXLAN instances configured on the present VTEP to the neighbor VTEPs; receiving VXLAN information announcement messages, carrying the identifiers of VXLAN instances configured on the neighbor VTEPs, from the neighbor VTEPs; if some neighbor VTEP is configured with the same VXLAN instance as the present VTEP, then setting up a tunnel to the neighbor VTEP; and associating the setup tunnel with the respective VXLAN instances configured on both the present VTEP and the neighbor VTEP.

In an example, the computer instructions are executed by the processor to further perform a processing including: if one of the VXLAN instances configured on the present VTEP is changed, then notifying the neighbor VTEPs of the VXLAN instance change; and updating the tunnel with the neighbor VTEP, and/or updating the VXLAN instances associated with the tunnel, with the VXLAN instance change.

In an example, the computer instructions are executed by the processor to further perform a processing including: receiving a VXLAN instance change from the neighbor VTEP; and updating the tunnel with the neighbor VTEP, and/or updating the VXLAN instances associated with the tunnel, with the VXLAN instance change.

In the two examples above, updating the tunnel with the neighbor VTEP, and/or updating the VXLAN instances associated with the tunnel, with the VXLAN instance change includes: if a VXLAN instance configured for the present VTEP and some neighbor VTEP is newly added to both of the VTEPs, then associating the tunnel to the neighbor VTEP with the newly added VXLAN instance configured on both of the VTEPs; and if a VXLAN instance configured for both the present VTEP and some neighbor VTEP is removed from both of the VTEPs, then dissociating the tunnel to the neighbor VTEP from the removed VXLAN instance configured on both of the VTEPs, using the VXLAN instance change.

The VTEP and the other VTEPs can be neighbors on which the same interior gateway protocol operates; and the VXLAN information announcement message may be an interior gateway protocol message carrying the VXLAN identifier.

In an example, the neighbor VTEP is an interior Border Gateway Protocol (iBGP) neighbor; and the VXLAN information announcement message may be included in a BGP Update message carrying the identifiers of the VXLAN instances configured on the present VTEP, and the identifiers of the VXLAN instances configured on the present VTEP are encapsulated in VNI extensible community.

As can be apparent from the above, the examples of the disclosure may include announcing the VXLAN instances configured on the VTEPs in the VXLAN network among the VTEPs, so that the respective VTEPs can discover all the other VTEPs configured with the same VXLAN instances, set up a tunnels automatically, and associate the setup tunnel with the VXLAN instance. In this way, a VTEP can be discovered automatically in the VXLAN network, thus alleviating a burden on the network administrator, avoiding a human error from occurring, and lowering a cost of network maintenance.

If the functions above are embodied in the form of software functional elements and sold or used as a separate product, then the product can be stored in a computer readable storage medium. This may be way of a software product stored in a storage medium and including several instructions to cause a computer device (e.g., a personal computer, a server, a network device, etc.) to perform all or a part of the blocks in the methods according to the respective embodiments of the disclosure. The storage medium above can include a U-disk, a mobile hard disk, a Read-Only Memory (ROM), a Random Access Memory (RAM), a magnetic disk, an optical disk or various other medium in which program codes can be stored.

The foregoing disclosure is merely illustrative of preferred embodiments of the disclosure but not intended to limit the disclosure, and any modifications, equivalent substitutions, adaptations, thereof made without departing from the spirit and scope of the disclosure shall be encompassed in the claimed scope of the appended claims.

The invention claimed is:

1. A method for deploying a Virtual Extensible Local Area Network (VXLAN), applicable to a VXLAN Tunnel End Point (VTEP) which is a neighbor of the other VTEP in a network where the VTEP resides, the method comprising:
   sending a VXLAN information announcement message carrying identifiers of a set of VXLAN instances configured on the present VTEP to the neighbor VTEP;
   receiving a VXLAN information announcement message carrying the identifiers of the set of VXLAN instances configured on the neighbor VTEPs, from the neighbor VTEPs;
   if the neighbor VTEP is configured with the same VXLAN instance as the present VTEP, then setting up a tunnel to the neighbor VTEP;
   associating the tunnel with the same VXLAN instance;
   if the VXLAN instances configured on the present VTEP is changed, then notifying the neighbor VTEPs of the VXLAN instance change;
   receiving a VXLAN instance change from the neighbor VTEP;
   if a new same VXLAN instance is determined, associating the tunnel to the neighbor VTEP with the new VXLAN instance; and
   if a same VXLAN instance is removed, dissociating the tunnel with the VXLAN instance.

2. The method according to claim 1, wherein the VXLAN instance change is carried in a routing information update message.

3. The method according to claim 1, wherein the VTEP and the neighbor VTEP are neighbors on which the same interior gateway protocol operates; and the VXLAN information announcement message is an interior gateway protocol message carrying the VXLAN identifier.

4. The method according to claim 3, wherein the neighbor VTEP is an interior Border Gateway Protocol (iBGP) neighbor; and the VXLAN information announcement message is a BGP Update message carrying the identifiers of the VXLAN instances configured on the present VTEP, and the identifiers of the VXLAN instances configured on the present VTEP are encapsulated in VXLAN Network Identifier (VNI) extensible community.

5. The method according to claim 1, wherein each VXLAN instance may be a separate forwarding entity in the VXLAN network.

6. The method according to claim 5, wherein the announcement message includes an extension field to announce other data to the neighbor VTEPs.

7. The method according to claim 5, wherein the all of the VTEPs are regarded as a multi-cast group.

8. The method according to claim 1, wherein the method further comprises:
comparing the VXLAN instances configured on the neighbor VTEPs with the VXLAN instances configured on the present VTEP.

9. A machine readable storage medium on which are stored machine readable instructions to deploy a Virtual Extensible Local Area Network (VXLAN), wherein the machine readable instructions are executable by a processor to:
send a VXLAN information announcement message carrying identifiers of a set of VXLAN instances configured on the present VXLAN Tunnel End Point (VTEP) to the neighbor VTEP;
receive a VXLAN information announcement message carrying the identifiers of the set of VXLAN instances configured on the neighbor VTEPs, from the neighbor VTEPs;
if the neighbor VTEP is configured with the same VXLAN instance as the present VTEP, then set up a tunnel to the neighbor VTEP;
associate the tunnel with the same VXLAN instance;
if the VXLAN instances configured on the present VTEP is changed, notify the neighbor VTEPs of the VXLAN instance change;
receive a VXLAN instance change from the neighbor VTEP;
if a new same VXLAN instance is determined, associating the tunnel to the neighbor VTEP with the new same VXLAN instance; and
if a same VXLAN instance is removed, dissociating the tunnel with the VXLAN instance.

10. The machine readable storage medium according to claim 9, wherein the VXLAN instance change is carried in a routing information update message.

11. The machine readable storage medium according to claim 9, wherein the VXLAN information announcement message is sent in multicast mode.

12. The machine readable storage medium according to claim 9, wherein the neighbor VTEP is an interior Border Gateway Protocol (iBGP) neighbor; and the VXLAN information announcement message is a BGP Update message carrying the identifiers of the VXLAN instances configured on the present VTEP, and the identifiers of the VXLAN instances configured on the present VTEP are encapsulated in VXLAN Network Identifier (VNI) extensible community.

13. A device for deploying a Virtual Extensible Local Area Network (VXLAN), applicable to a VXLAN Tunnel End Point (VTEP) which is a neighbor of the other VTEPs in a network where the VTEP resides, the device comprising:
an instance information announcing unit configured to send a VXLAN information announcement message carrying the identifiers of a set of VXLAN instances configured on the present VTEP to the neighbor VTEP;
an instance information receiving unit configured to receive VXLAN information announcement messages carrying the identifiers of VXLAN instances configured on the neighbor VTEPs, from the neighbor VTEP;
a tunnel setting-up unit configured, if some neighbor VTEP is configured with the same VXLAN instance as the present VTEP, to set up a tunnel to the neighbor VTEP;
an associating unit configured to associate the setup tunnel with the same VXLAN instances;
an instance change notifying unit configured to notify the neighbor VTEP of the VXLAN instance change if the VXLAN instances configured on the present VTEP is changed
an instance change receiving unit configured to receive a VXLAN instance change from the neighbor VTEP; and
an instance change updating unit configured to associate the tunnel to the neighbor VTEP with the new VXLAN instance if a new same VXLAN instance is determined and dissociate the tunnel with the VXLAN instance if a same VXLAN instance is removed.

14. The device according to claim 13, wherein the VXLAN instance change is carried in a routing information update message.

15. The device according to claim 13, wherein the VTEP and the neighbor VTEP are neighbors on which the same interior gateway protocol operates; and the VXLAN information announcement message is an interior gateway protocol message carrying the VXLAN identifier.

16. The device according to claim 13, wherein the neighbor VTEP is an interior Border Gateway Protocol (iBGP) neighbor; and the VXLAN information announcement message is a BGP Update message carrying the identifiers of the VXLAN instances configured on the present VTEP, and the identifiers of the VXLAN instances configured on the present VTEP are encapsulated in VXLAN Network Identifier (VNI) extensible community.

17. The device according to claim 13, wherein the announcement message includes an extension field to announce other data to the neighbor VTEPs.

* * * * *